United States Patent
Guo

(10) Patent No.: US 8,767,875 B2
(45) Date of Patent: Jul. 1, 2014

(54) MULTI-LAYER BEAM FORMING METHOD AND USER EQUIPMENT (UE) FOR IMPLEMENTING MULTI-LAYER BEAM FORMING

(76) Inventor: Yang Guo, Shenzhen (CN)

( * ) Notice: Subject to any disclaimer, the term of this patent is extended or adjusted under 35 U.S.C. 154(b) by 0 days.

(21) Appl. No.: 13/981,828

(22) PCT Filed: Jul. 6, 2011

(86) PCT No.: PCT/CN2011/076892
§ 371 (c)(1),
(2), (4) Date: Jul. 25, 2013

(87) PCT Pub. No.: WO2012/100505
PCT Pub. Date: Aug. 2, 2012

(65) Prior Publication Data
US 2013/0308727 A1    Nov. 21, 2013

(30) Foreign Application Priority Data
Jan. 26, 2011    (CN) .......................... 2011 1 0028120

(51) Int. Cl.
*H04L 27/00* (2006.01)
*H04L 1/02* (2006.01)

(52) U.S. Cl.
USPC .......................................... 375/299; 375/347

(58) Field of Classification Search
USPC ......... 375/299, 220, 267, 316, 340, 346, 347; 455/101, 450
See application file for complete search history.

(56) References Cited

U.S. PATENT DOCUMENTS

2008/0219373 A1    9/2008  Zhang et al.
2013/0003896 A1*   1/2013  Weisman et al. ............ 375/340
2013/0107923 A1*   5/2013  Salhov et al. ................ 375/222

FOREIGN PATENT DOCUMENTS

| CN | 101729115 A | 6/2010 |
| CN | 101808341 A | 8/2010 |
| CN | 102013908 A | 4/2011 |

OTHER PUBLICATIONS

International Search Report dated Oct. 20, 2011 for Application No. PCT/CN2011/076892.
espacenet English abstract of CN 102013908 A dated Apr. 2011.
espacenet English abstract of CN 101729115 A dated Jun. 2010.
espacenet English abstract of CN 101808341 A dated Aug. 2010.
Potevio: "Impact of user pairing on TDD transparent MU-MIMO dual-layer beamforming", 3GPP TSG RAN WG1 Meeting #58 R1-093442, Aug. 24-28, 2009, 4 pages.

* cited by examiner

*Primary Examiner* — Khai Tran
(74) *Attorney, Agent, or Firm* — Ladas & Parry LLP

(57) ABSTRACT

The disclosure provides a multi-layer beam forming method. The method includes: according to an obtained transmitting weight value of each space channel layer, obtaining a signal-to-noise ratio of a data stream, arriving at a receiving side, of each layer; according the obtained signal-to-noise ratio of the data stream, arriving at the receiving side, of each layer, determining a data stream which is able to be transmitted; performing beam forming for the data stream which is able to be transmitted and transmitting the data stream subjected to the beam forming to the receiving side. The disclosure further provides User Equipment (UE) for implementing multi-layer beam forming. Only a data stream, which can be decoded by a receiving side, of each layer is transmitted, thereby utilizing channel capacity to the most extent while adequately and reasonably utilizing space channel resources.

10 Claims, 2 Drawing Sheets

MULTI-LAYER BEAM FORMING METHOD AND USER EQUIPMENT (UE) FOR IMPLEMENTING MULTI-LAYER BEAM FORMING

RELATED APPLICATION INFORMATION

This application is a 371 of International Application PCT/CN2011/076892 filed 6 Jul. 2011 entitled "Multi-Layer Beam Forming Method and user Equipment (UE) for Implementing Multi-Layer Beam Forming", which was published on 2 Aug. 2012, with International Publication No. WO 2012/100505 A1, and which claims priority from CN Application No.: 201110028120.9 filed 26 Jan. 2011, the contents of which are incorporated herein by reference.

TECHNICAL FIELD

The disclosure relates to a beam forming technology of a Multiple Input and Multiple Output (MIMO) communication system, and more particularly, to a multi-layer beam forming method and User Equipment (UE) for implementing multi-layer beam forming.

BACKGROUND

Because of the ability to improve channel capability effectively, an MIMO system has received much attention during researches of Long-Term Evolution (LTE) and Advanced Long-Term Evolution (LTE-A).

A beam forming technology operates mainly by controlling a beam direction. A beam in a characteristic direction is obtained utilizing an antenna array structure, and a user terminal is distinguished according to a location of the user terminal so as to realize multiplexing of the same time and frequency resources by multiple users, thus obtaining evident beam energy gain, improving cell coverage and a capability of the MIMO system, reducing interference of the MIMO system, increasing the capability of the MIMO system, improving link reliability and increasing peak rate. At the same time, the beam forming technology can control a beam by utilizing the direction with the strongest user signals so as to perform data transmission by using several strongest paths in a multipath channel environment. The beam forming technology is more applicable to open suburbs and can be also applied in complicated urban environments. The beam forming technology is especially applicable to a short antenna space (e.g. 0.5λ), which is beneficial for controlling beam orientation.

In a single-user MIMO mode, multiple data streams can be transmitted by multiple layers at the same time by designing appropriate weight vectors of a transmitting antenna and a receiving antenna. In addition, data of multiple layers can be transmitted in parallel and interference among layers can be eliminated. In a multi-user MIMO mode, a direction of a beam subjected to the beam forming can be designed by designing appropriate weight vectors of a transmitting antenna and a receiving antenna and signals of multiple users are distinguished, so as to eliminate interference among users.

The current beam forming technology is mainly applied to a data stream of a single-layer. For the single-user MIMO mode, a terminal side directly performs beam forming for an uplink data stream to be transmitted and transmits the uplink data stream subjected to the beam forming to a base station side, wherein the uplink data stream to be transmitted is an uplink data stream of a single layer.

For the Third Generation Partnership Project (3 GPP) Release 10 (Rel-10) standard which will start to be proposed soon, the number of antennae at the base station side of the MIMO system will be increased to more than 8, and the number of antennae at the terminal side will be increased to more than 4. So for the beam forming technology, the number of layers used in the beam forming needs to be controlled. An existing single-layer beam forming technology needs to be extended into a multi-layer beam forming technology, so as to adequately and reasonably utilize space channel resources.

SUMMARY

In view of the above, the disclosure provides a multi-layer beam forming method and UE for implementing multi-layer beam forming, so as to control the number of layers used in beam forming.

The disclosure provides the following technical solution.

The disclosure provides a multi-layer beam forming method, the method includes: according to an obtained transmitting weight value of each space channel layer, UE obtaining a signal-to-noise ratio of a data stream, arriving at a receiving side, of each space channel layer; according the obtained signal-to-noise ratio of the data stream, arriving at the receiving side, of each space channel layer, the UE determines a data stream which is able to be transmitted; the UE performing beam forming for the data stream which is able to be transmitted and transmitting the data stream subjected to the beam forming to the receiving side.

In the solution above, a process in which the UE obtains the transmitting weight value of each space channel layer includes: the UE obtaining an uplink channel matrix, performing characteristic value decomposition for the obtained uplink channel matrix to obtain a gain of each space channel layer which is the transmitting weight value of each space channel layer, and calculating a product of the transmitting weight value of each space channel layer and a signal-to-noise ratio of a link of the UE to obtain the signal-to-noise ratio of the data stream, arriving at the receiving side, of each space channel layer.

In the solution above, the process in which the UE determines the data stream which is able to be transmitted according the obtained signal-to-noise ratio of the data stream, arriving at the receiving side, of each space channel layer includes: the UE comparing the obtained signal-to-noise ratio of the data stream, arriving at the receiving side, of each space channel layer and a preconfigured signal-to-noise ratio threshold, and determining that a data stream, whose signal-to-noise ratio when the data stream arrives at the receiving side is greater than the signal-to-noise ratio threshold, of each space channel layer is the data stream which is able to be transmitted.

In the solution above, the process in which the UE performs the beam forming for the data stream which is able to be transmitted and transmits the data stream subjected to the beam forming to the receiving side includes: the UE coding and modulating the data stream which is able to be transmitted, and loading a dedicated reference signal of each space channel layer for the data stream which is able to be transmitted, mapping the data stream which is able to be transmitted to a transmitting antenna of UE according to the transmitting weight value of a space channel layer in which the data stream which is able to be transmitted locates, and transmitting the data stream which is able to be transmitted to the receiving side via the transmitting antenna.

The disclosure also provides UE for implementing multi-layer beam forming, the UE includes: an obtaining unit, a determining unit and a transmitting unit, wherein the obtaining unit is configured to, according to an obtained transmitting weight value of each space channel layer, obtain a signal-to-noise ratio of a data stream, arriving at a receiving side, of each space channel layer; the determining unit is configured to, according to the signal-to-noise ratio obtained by the obtaining unit, determine a data stream which is able to be transmitted; the transmitting unit is configured to, perform beam forming for the data stream determined by the determining unit and transmit the data stream subjected to the beam forming to the receiving side.

In the solution above, the obtaining unit is configured to obtain an uplink channel matrix, perform characteristic value decomposition for the obtained uplink channel matrix to obtain a gain of each space channel layer which is the transmitting weight value of each space channel layer, and calculate a product of the transmitting weight value of each space channel layer and a signal-to-noise ratio of a link of the UE to obtain the signal-to-noise ratio of the data stream, arriving at the receiving side, of each space channel layer.

In the solution above, the UE further includes: a configuring unit, configured to pre-configure a signal-to-noise ratio threshold; the determining unit is configured to compare the signal-to-noise ratio obtained by the obtaining unit and the signal-to-noise ratio threshold preconfigured by the configuring unit, and determine that a data stream, whose signal-to-noise ratio when the data stream arrives at the receiving side is greater than the signal-to-noise ratio threshold, of each space channel layer is the data stream which is able to be transmitted.

In the solution above, the transmitting unit is configured to code and modulate the data stream determined by the determining unit, load a dedicated reference signal of each space channel layer for the data stream determined by the determining unit, map the data stream which is able to be transmitted to a transmitting antenna of the UE according to the transmitting weight value of a space channel layer in which the data stream which is able to be transmitted locates, and transmit the data stream which is able to be transmitted to the receiving side via the transmitting antenna.

According to the multi-layer beam forming method and the UE for implementing multi-layer beam forming, the UE, according to a signal-to-noise ratio of a data stream, arriving at a receiving side, of each layer, determines a data stream which is able to be transmitted, and then performs beam forming for the data stream which is able to be transmitted and transmits the data stream subjected to the beam forming. A beam forming solution applicable to data transmission, which uses multiple layers at uplink in a communication system using the Time-Division Duplexing (TDD) technology, is provided. Data streams of multiple layers are considered as a whole and only data streams, which can be decoded by the receiving side, of each layer are transmitted, thereby utilizing channel capacity to the most extent while adequately and reasonably utilizing space channel resources.

DETAILED DESCRIPTION OF THE EMBODIMENTS

In a TDD MIMO system, an uplink channel and a downlink channel are at the same frequency band, and uplink transmission and downlink transmission are switched through change of time only. Therefore, the uplink channel and the downlink channel are reciprocal, i.e. information of the uplink channel can be obtained directly by obtaining information of the downlink channel, which is beneficial for using a channel matrix and performing characteristic value decomposition for the channel matrix to obtain a beam forming transmitting weight value, thus utilizing channel capacity to the most extent.

The basic principle of the embodiments of the disclosure is that: for a MIMO system which applies the TDD technology, a UE side obtains a transmitting weight value of a data stream to be transmitted of each layer first, and then selectively performs weighted transmission for the data stream of each layer, thus utilizing channel capacity to the most extent while adequately and reasonably utilizing space channel resources.

Figure 1:
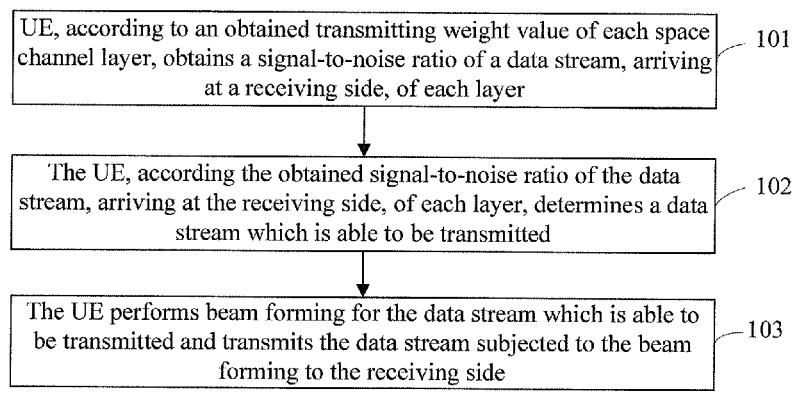
FIG. 1 is a flowchart for implementing a multi-layer beam forming method in accordance with an embodiment of the disclosure.

The multi-layer beam forming method of an embodiment of the disclosure is applied to a communication system which applies the TDD technology, e.g. a MIMO system which applies the TDD technology. As shown in FIG. 1, the method mainly includes the following steps.

Step 101: According to an obtained transmitting weight value of each space channel layer, UE obtains a signal-to-noise ratio of a data stream, arriving at a receiving side, of each layer.

Step 102: According the obtained signal-to-noise ratio of the data stream, arriving at the receiving side, of each layer, the UE determines a data stream which is able to be transmitted.

Step 103: The UE performs beam forming for the data stream which is able to be transmitted and transmits the data stream subjected to the beam forming to the receiving side.

Here, the receiving side is a base station side generally.

In Step 101, the process in which the UE obtains the transmitting weight value of each space channel layer includes that: the UE obtains an uplink channel matrix, performs characteristic value decomposition for the obtained uplink channel matrix to obtain a gain of each space channel layer, i.e. the transmitting weight value of each space channel layer, and calculates a product of the transmitting weight value of each space channel layer and a signal-to-noise ratio of a link of the UE, to obtain the signal-to-noise ratio of the data stream, arriving at the receiving side, of each layer.

Here, the UE obtains a downlink channel matrix via channel estimation and obtains the uplink channel matrix according to reciprocity of a TDD channel.

In Step 102, the process in which the UE determines the data stream which is able to be transmitted according to the obtained signal-to-noise ratio of the data stream, arriving at the receiving side, of each layer includes that: the UE compares the obtained signal-to-noise ratio of the data stream, arriving at the receiving side, of each layer and a preconfigured signal-to-noise ratio threshold, and determines that a data stream, whose signal-to-noise ratio when the data stream arrives at the receiving side is greater than the signal-to-noise ratio threshold, of each layer is the data stream which is able to be transmitted.

Here, the signal-to-noise ratio threshold may be set as a receiving signal-to-noise ratio $SNR_{RX}$ when a block correct ratio of the receiving side reaches a threshold P evaluated by simulation. Here, the block correct ratio of the receiving side is a difference value obtained by deducting a Block Error Ratio (BLER) of the receiving side from 1, and the value of P is 70% preferably. During actual applications, for each channel transmission scenario, a relationship between the signal-to-noise ratio and the BLER of the receiving side can be obtained through simulation test. The specific process is a technique commonly used in the art, which will not be repeated here.

In Step 103, the process in which the UE performs the beam forming for the data stream which is able to be transmitted and transmits the data stream subjected to the beam forming to the receiving side includes that: the UE codes and modulates the data stream which is able to be transmitted, loads a DRS of each layer for the data stream which is able to be transmitted, maps the data stream which is able to be transmitted to a transmitting antenna of the UE according to the transmitting weight value of the space channel layer in which the data stream which is able to be transmitted locates, and transmits the data stream which is able to be transmitted to the receiving side via the transmitting antenna.

Correspondingly, an embodiment of the disclosure also provides UE for implementing multi-layer beam forming. The UE mainly includes: an obtaining unit, a determining unit and a transmitting unit, wherein the obtaining unit is configured to, according to an obtained transmitting weight value of each space channel layer, obtain a signal-to-noise ratio of a data stream, arriving at a receiving side, of each layer; the determining unit is configured to, according to the signal-to-noise ratio obtained by the obtaining unit, of the data stream arriving at the receiving side, of each layer, determines a data stream which is able to be transmitted; the transmitting unit is configured to, perform beam forming for the data stream which is determined by the determining unit and is able to be transmitted and transmit the data stream subjected to the beam forming to the receiving side.

The obtaining unit may be configured to obtain an uplink channel matrix, perform characteristic value decomposition for the obtained uplink channel matrix to obtain a gain of each space channel layer, i.e. the transmitting weight value of each space channel layer, and calculate a product of the transmitting weight value of each space channel layer and a signal-to-noise ratio of a link of the UE, to obtain the signal-to-noise ratio of the data stream, arriving at the receiving side, of each layer.

The UE may further include: a configuring unit, configured to pre-configure a signal-to-noise ratio threshold;

here, the determining unit may be configured to compare the signal-to-noise ratio obtained by the obtaining unit, of the data stream arriving at the receiving side, of each layer and the signal-to-noise ratio threshold preconfigured by the configuring unit, and determine that a data stream, whose signal-to-noise ratio when the data stream arrives at the receiving side is greater than the signal-to-noise ratio threshold, of each layer is the data stream which is able to be transmitted.

The transmitting unit may be configured to code and modulate the data stream which is able to be transmitted, load a DRS of each layer for the data stream which is able to be transmitted, map the data stream which is able to be transmitted to a transmitting antenna of the UE according to the transmitting weight value of the space channel layer in which the data stream which is able to be transmitted locates, and transmit the data stream which is able to be transmitted to the receiving side via the transmitting antenna.

Figure 2:
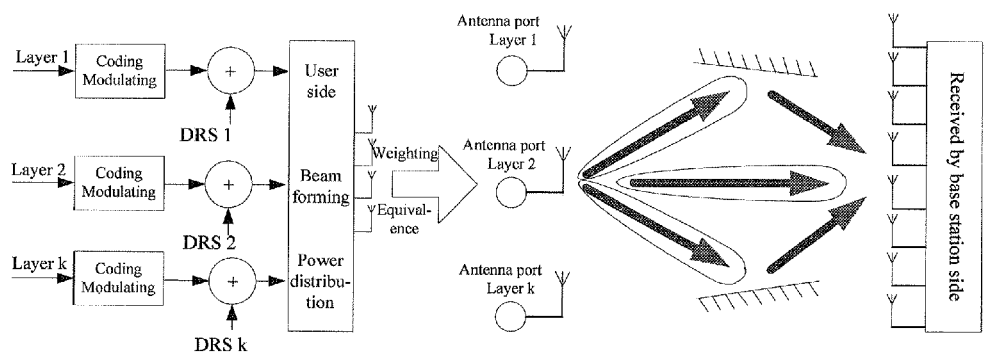
FIG. 2 is a schematic diagram illustrating implementation of a multi-layer beam forming process in an embodiment of the disclosure.

FIG. 2 is a specific embodiment illustrating an implementation process of multi-layer beam forming of a TDD system of the disclosure. UE serves as a transmitting side. Since the noise is a known value, the signal-to-noise ratio $SNR_{TX}$ the link of the transmitting side is also a known value and pre-configured in the UE. If the UE serves as a transmitting side currently, the number of antennae of the UE is N, a base station serves as a receiving side, and the number of antennae of the base station is M, then an obtained uplink channel matrix H is a M*N-dimension matrix as shown in the following formula (1).

$$H = \begin{bmatrix} h_{11} & h_{12} & h_{13} & \ldots & h_{1n} \\ h_{21} & h_{22} & h_{23} & \ldots & h_{2n} \\ \vdots & \vdots & \vdots & \ddots & \vdots \\ h_{m1} & h_{m2} & h_{m3} & \ldots & h_{mn} \end{bmatrix} \quad (1)$$

After performing characteristic value decomposition for the uplink channel matrix H, a characteristic value matrix E is obtained, as shown in the following formula (2):

$$E = \begin{bmatrix} \lambda_{11} & 0 & \ldots & 0 & 0 \\ 0 & \lambda_{22} & \ldots & 0 & 0 \\ \vdots & \vdots & \ddots & 0 & \vdots \\ 0 & 0 & \ldots & \lambda_{ff} & 0 \end{bmatrix} \quad (2)$$

wherein a characteristic vector of the first column corresponding to a characteristic value $\lambda_{11}$ is the weight vector required to be used by layer 1; a characteristic vector of the $f^{th}$ column corresponding to a characteristic value $\lambda_{ff}$ is the weight vector required to be used by layer f; $\lambda_{11}$ is a gain of a space channel layer 1, $\lambda_{22}$ is a gain of a space channel layer 2, ..., $\lambda_{ff}$ is a gain of a space channel layer f. Here, the number f of space channel layers satisfies the following formula (3):

$$f=\min(M, N) \quad (3)$$

According to the obtained gain of each space channel layer, i.e. the transmitting weight value of each space channel layer, the obtained signal-to-noise ratio of the data stream, arriving at the receiving side, of each layer is as follows: the signal-to-noise ratio of the data stream, arriving at the receiving side, of layer 1 is $SNR_{TX}*\lambda_{11}$, the signal-to-noise ratio of the data stream, arriving at the receiving side, of layer 2 is $SNR_{TX}*\lambda_{22}$, ..., and the signal-to-noise ratio of the data stream, arriving at the receiving side, of layer f is $SNR_{TX}*\lambda_{ff}$.

The UE compares the obtained signal-to-noise ratios of the data streams, arriving at the receiving side, in f space channel layers, and a preconfigured signal-to-noise ratio threshold $SNR_{RX}$. When the signal-to-noise ratio of the data stream arriving at the receiving side is greater than the preconfigured signal-to-noise ratio threshold $SNR_{RX}$, the data stream of the layer can be decoded normally at the receiving side and the UE determines that the data stream of the layer can be transmitted. In a specific embodiment as shown in FIG. 2, the signal-to-noise ratios of data streams, arriving at the receiving side, of k layers are greater than the signal-to-noise ratio threshold $SNR_{RX}$. At the moment, the UE determines to perform beam forming for the data streams of the k layers and transmit the data streams subjected to the beam forming to the receiving side.

Figure 3:
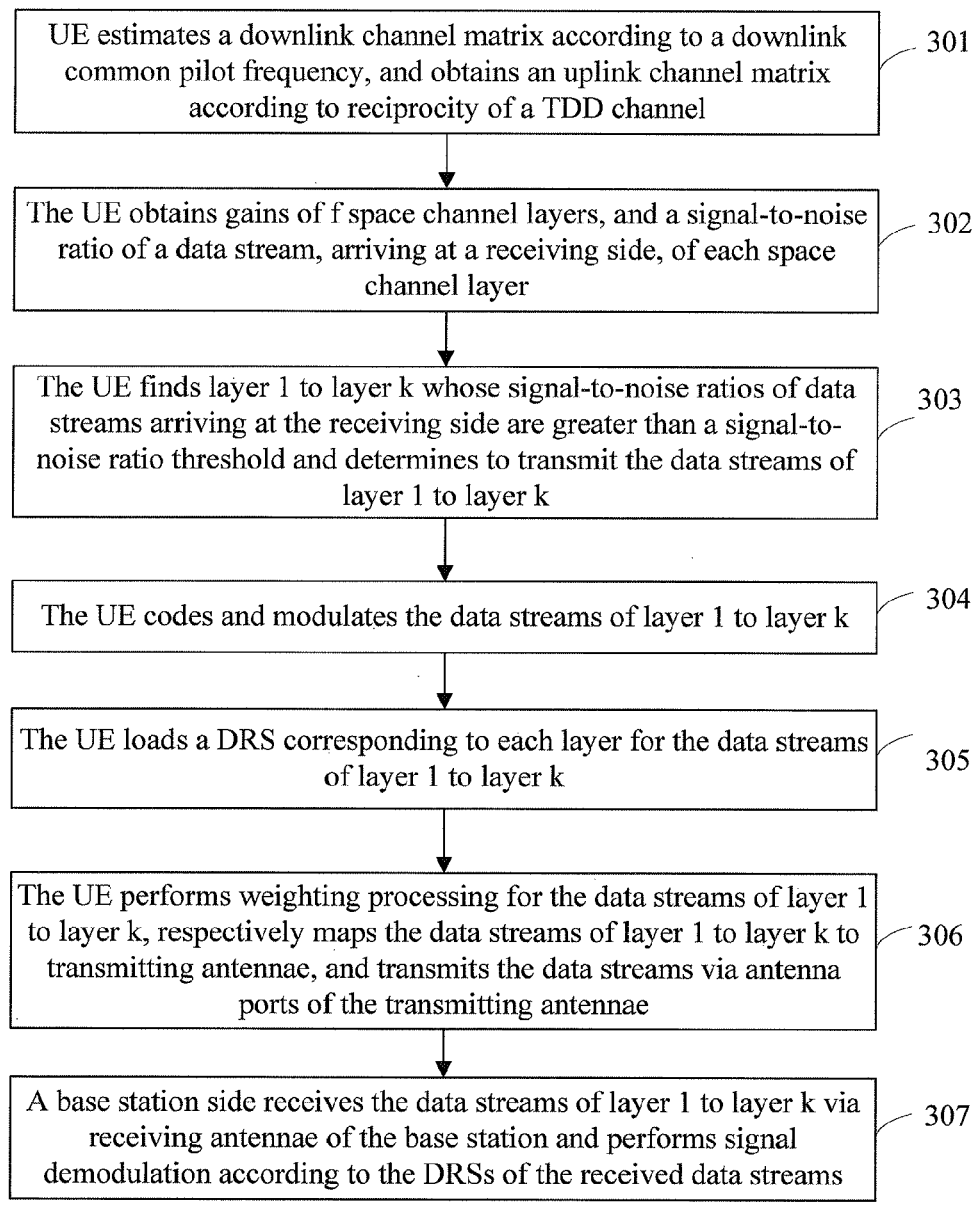
FIG. 3 is a specific implementation flowchart of the embodiment as illustrated in FIG. 2.

As shown in FIG. 3, the specific implementation process of a beam forming process as shown in FIG. 2 may include the following steps.

Step 301: The UE estimates a downlink channel matrix according to a downlink common pilot frequency, and obtains an uplink channel matrix according to reciprocity of a TDD channel.

Step 302: The UE performs characteristic value decomposition for the obtained uplink channel matrix to obtain gains of f space channel layers and corresponding f columns of characteristic vectors, and according to the obtained gain of each space channel layer, obtains the signal-to-noise ratio of the data stream, arriving at the receiving side, of each space channel layer.

Step 303: The UE finds layer 1 to layer k whose signal-to-noise ratios of data streams arriving at the receiving side are greater than a signal-to-noise ratio threshold $SNR_{RX}$ and determines to transmit the data streams of layer 1 to layer k.

Step 304: The UE codes and modulates the data streams of layer 1 to layer k.

Step 305: The UE loads a DRS corresponding to each layer for the data streams of layer 1 to layer k.

Here, the DRS is preconfigured at the UE and the receiving side.

Step 306: The UE, according to the gain of each layer obtained in Step 302, i.e. the transmitting weight value of each layer, performs weighting processing for the data streams of layer 1 to layer k, respectively maps the data streams of layer 1 to layer k to transmitting antennae, and transmits the data streams via antenna ports of the transmitting antennae to complete a beam forming process.

Step 307: The base station serving as the receiving side receives the data streams of layer 1 to layer k via receiving antennae of the base station and performs signal demodulation according to the DRSs of the received data streams.

The above are only preferred embodiments of the disclosure and should not be used to limit the scope of protection of the disclosure. Any modifications, equivalent replacements, improvements and the like within the principle of the disclosure shall fall within the scope of protection of the disclosure.

What is claimed is:

1. A multi-layer beam forming method, comprising:
   according to an obtained transmitting weight value of each space channel layer, obtaining a signal-to-noise ratio of a data stream, arriving at a receiving side, of each space channel layer;
   according the obtained signal-to-noise ratio of the data stream, arriving at the receiving side, of each space channel layer, determining a data stream which is able to be transmitted;
   performing beam forming for the data stream which is able to be transmitted and transmitting the data stream subjected to the beam forming to the receiving side;
   wherein a process of determining the data stream which is able to be transmitted according to the obtained signal-to-noise ratio of the data stream, arriving at the receiving side, of each space channel layer comprises:
   comparing the obtained signal-to-noise ratio of the data stream, arriving at the receiving side, of each space channel layer and a preconfigured signal-to-noise ratio threshold, and determining that a data stream, whose signal-to-noise ratio when the data stream arrives at the receiving side is greater than the signal-to-noise ratio threshold, of each space channel layer is the data stream which is able to be transmitted.

2. The multi-layer beam forming method according to claim 1, wherein a process of obtaining the transmitting weight value of each space channel layer comprises:
   obtaining an uplink channel matrix, performing characteristic value decomposition for the obtained uplink channel matrix to obtain a gain of each space channel layer which is the transmitting weight value of each space channel layer, and calculating a product of the transmitting weight value of each space channel layer and a signal-to-noise ratio of a link of User Equipment (UE) to obtain the signal-to-noise ratio of the data stream, arriving at the receiving side, of each space channel layer.

3. The multi-layer beam forming method according to claim 2, wherein a process of performing the beam forming for the data stream which is able to be transmitted and transmitting the data stream subjected to the beam forming to the receiving side comprises:
   coding and modulating the data stream which is able to be transmitted, and loading a dedicated reference signal of each space channel layer for the data stream which is able to be transmitted, mapping the data stream which is able to be transmitted to a transmitting antenna of UE according to the transmitting weight value of a space channel layer in which the data stream which is able to be transmitted locates, and transmitting the data stream which is able to be transmitted to the receiving side via the transmitting antenna.

4. The multi-layer beam forming method according to claim 1, wherein a process of performing the beam forming for the data stream which is able to be transmitted and transmitting the data stream subjected to the beam forming to the receiving side comprises:
   coding and modulating the data stream which is able to be transmitted, and loading a dedicated reference signal of each space channel layer for the data stream which is able to be transmitted, mapping the data stream which is able to be transmitted to a transmitting antenna of UE according to the transmitting weight value of a space channel layer in which the data stream which is able to be transmitted locates, and transmitting the data stream which is able to be transmitted to the receiving side via the transmitting antenna.

5. The multi-layer beam forming method according to claim 1, wherein a process of performing the beam forming for the data stream which is able to be transmitted and transmitting the data stream subjected to the beam forming to the receiving side comprises:
   coding and modulating the data stream which is able to be transmitted, and loading a dedicated reference signal of each space channel layer for the data stream which is able to be transmitted, mapping the data stream which is able to be transmitted to a transmitting antenna of UE according to the transmitting weight value of a space channel layer in which the data stream which is able to be transmitted locates, and transmitting the data stream which is able to be transmitted to the receiving side via the transmitting antenna.

6. User Equipment (UE) for implementing multi-layer beam forming, comprising: an obtaining unit, a determining unit and a transmitting unit, wherein
   the obtaining unit is configured to, according to an obtained transmitting weight value of each space channel layer, obtain a signal-to-noise ratio of a data stream, arriving at a receiving side, of each space channel layer;
   the determining unit is configured to, according to the signal-to-noise ratio obtained by the obtaining unit, determine a data stream which is able to be transmitted;
   the transmitting unit is configured to, perform beam forming for the data stream determined by the determining unit and transmit the data stream subjected to the beam forming to the receiving side;

wherein the UE further comprises: a configuring unit, configured to pre-configure a signal-to-noise ratio threshold; and the determining unit is configured to compare the signal-to-noise ratio obtained by the obtaining unit and the signal-to-noise ratio threshold preconfigured by the configuring unit, and determine that a data stream, whose signal-to-noise ratio when the data stream arrives at the receiving side is greater than the signal-to-noise ratio threshold, of each space channel layer is the data stream which is able to be transmitted.

7. The UE for implementing multi-layer beam forming according to claim 6, wherein the obtaining unit is configured to obtain an uplink channel matrix, perform characteristic value decomposition for the obtained uplink channel matrix to obtain a gain of each space channel layer which is the transmitting weight value of each space channel layer, and calculate a product of the transmitting weight value of each space channel layer and a signal-to-noise ratio of a link of the UE to obtain the signal-to-noise ratio of the data stream, arriving at the receiving side, of each space channel layer.

8. The UE for implementing multi-layer beam forming according to claim 7, wherein the transmitting unit is configured to code and modulate the data stream determined by the determining unit, load a dedicated reference signal of each space channel layer for the data stream determined by the determining unit, map the data stream which is able to be transmitted to a transmitting antenna of the UE according to the transmitting weight value of a space channel layer in which the data stream which is able to be transmitted locates, and transmit the data stream which is able to be transmitted to the receiving side via the transmitting antenna.

9. The UE for implementing multi-layer beam forming according to claim 6, wherein the transmitting unit is configured to code and modulate the data stream determined by the determining unit, load a dedicated reference signal of each space channel layer for the data stream determined by the determining unit, map the data stream which is able to be transmitted to a transmitting antenna of the UE according to the transmitting weight value of a space channel layer in which the data stream which is able to be transmitted locates, and transmit the data stream which is able to be transmitted to the receiving side via the transmitting antenna.

10. The UE for implementing multi-layer beam forming according to claim 6, wherein the transmitting unit is configured to code and modulate the data stream determined by the determining unit, load a dedicated reference signal of each space channel layer for the data stream determined by the determining unit, map the data stream which is able to be transmitted to a transmitting antenna of the UE according to the transmitting weight value of a space channel layer in which the data stream which is able to be transmitted locates, and transmit the data stream which is able to be transmitted to the receiving side via the transmitting antenna.

* * * * *

UNITED STATES PATENT AND TRADEMARK OFFICE
CERTIFICATE OF CORRECTION

| | | |
|---|---|---|
| PATENT NO. | : 8,767,875 B2 | Page 1 of 1 |
| APPLICATION NO. | : 13/981828 | |
| DATED | : July 1, 2014 | |
| INVENTOR(S) | : Yan Guo | |

It is certified that error appears in the above-identified patent and that said Letters Patent is hereby corrected as shown below:

Title page: item 73 insert assignee --ZTE CORPORATION--.

Signed and Sealed this
Fifth Day of January, 2016

Michelle K. Lee
*Director of the United States Patent and Trademark Office*

UNITED STATES PATENT AND TRADEMARK OFFICE
CERTIFICATE OF CORRECTION

| | | |
|---|---|---|
| PATENT NO. | : 8,767,875 B2 | Page 1 of 1 |
| APPLICATION NO. | : 13/981828 | |
| DATED | : July 1, 2014 | |
| INVENTOR(S) | : Yan Guo | |

It is certified that error appears in the above-identified patent and that said Letters Patent is hereby corrected as shown below:

Title page: item 76 should be changed to item 75.

Title page: item 73 insert assignee --ZTE CORPORATION--.

This certificate supersedes the Certificate of Correction issued January 5, 2016.

Signed and Sealed this
Third Day of May, 2016

Michelle K. Lee
*Director of the United States Patent and Trademark Office*